(12) United States Patent
Kvernvik et al.

(10) Patent No.: US 8,788,438 B2
(45) Date of Patent: Jul. 22, 2014

(54) METHOD PERFORMED IN A COMPUTER SYSTEM FOR AIDING THE ASSESSMENT OF AN INFLUENCE OF A USER IN OR INTERACTING WITH A COMMUNICATION SYSTEM BY APPLYING SOCIAL NETWORK ANALYSIS, SNA, FUNCTIONS, A COMPUTER SYSTEM, COMPUTER PROGRAM AND COMPUTER PROGRAM PRODUCT

(75) Inventors: Tor Kvernvik, Taby (SE); Jonathan Magnusson, Uppsala (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 303 days.

(21) Appl. No.: 13/302,189

(22) Filed: Nov. 22, 2011

(65) Prior Publication Data
US 2013/0132309 A1    May 23, 2013

(51) Int. Cl.
*G06F 7/00*         (2006.01)
*G06F 15/18*        (2006.01)
*G06N 99/00*        (2010.01)

(52) U.S. Cl.
CPC ................................... *G06N 99/005* (2013.01)
USPC ............................. 706/12; 706/20; 707/705

(58) Field of Classification Search
None
See application file for complete search history.

(56) References Cited

U.S. PATENT DOCUMENTS

| | | | |
|---|---|---|---|
| 2013/0041860 A1* | 2/2013 | Lawrence et al. | 706/46 |
| 2013/0254294 A1* | 9/2013 | Isaksson | 709/204 |
| 2013/0282627 A1* | 10/2013 | Faddoul et al. | 706/12 |

* cited by examiner

*Primary Examiner* — Alan Chen
(74) *Attorney, Agent, or Firm* — Rothwell, Figg, Ernst & Manbeck, P.C.

(57) ABSTRACT

The invention relates to a method performed in a computer system for aiding the assessment of an influence of a user in or interacting with a communication system by applying social network analysis, SNA, functions. The method comprises: obtaining two or more SNA metrics for each user of a first number of users, each SNA metric being determined by a respective SNA function; calculating a weight parameter for each one of the SNA metrics using a machine learning method, the weight parameters indicating a combination of the SNA metrics for use in the assessment of the influence of the user; and applying the estimated weight parameters to SNA metrics of a second number of users to assess a ranking in accordance with influence of users in the second number of users. The invention also relates to a computer system, computer programs, and computer program products.

22 Claims, 6 Drawing Sheets

| Subscriber id | Degree Centrality | in-Degree Centrality | out-Degree Centrality | Ego Betweeness Centrality | Eigenvector centrality | Important |
|---|---|---|---|---|---|---|
| 1 | 6 | 4 | 3 | 15 | 0.46 | No |
| 2 | 13 | 10 | 10 | 41 | 1.01 | No |
| 3 | 28 | 20 | 17 | 184.8 | 2.26 | Yes |
| 4 | 14 | 13 | 7 | 40 | 1.26 | No |
| 5 | 9 | 4 | 7 | 19.5 | 0.88 | No |
| ... | ... | ... | ... | ... | ... | ... |
| 9999 | 32 | 26 | 15 | 192.2 | 2.54 | Yes |
| 10000 | 5 | 4 | 4 | 4 | 0.49 | No |

Fig. 6

# METHOD PERFORMED IN A COMPUTER SYSTEM FOR AIDING THE ASSESSMENT OF AN INFLUENCE OF A USER IN OR INTERACTING WITH A COMMUNICATION SYSTEM BY APPLYING SOCIAL NETWORK ANALYSIS, SNA, FUNCTIONS, A COMPUTER SYSTEM, COMPUTER PROGRAM AND COMPUTER PROGRAM PRODUCT

TECHNICAL FIELD

The technology disclosed herein relates generally to the field of communication systems, and in particular to social network analysis in such communication systems.

BACKGROUND

Operators of telecommunication systems are interested in knowing as much as possible about their customers, i.e. about the users of telecommunication services. This knowledge enables the operator to customize services, to render marketing and advertising more efficiently, to identify and target important or influential users, to share the knowledge with third parties, just to mention a few examples. The use of social network analysis (SNA) algorithms is a way of gaining the desired knowledge and various algorithms and analysis methods are available for extracting and compiling data about the users.

By using such SNA algorithms, the individual behavior of a user in the telecommunication system and his interaction with other users can be analyzed. Data available from Call Data Records (CDR) may be used as input to the SNA algorithms. The CDR comprises information about made calls, calling and called parties, time of day, duration, location, type of service etc.

The amount of traffic in the telecommunication systems is increasing rapidly, and billions of calls are made every month giving huge amount of data in the CDRs. Further, the number of SNA algorithms for finding valuable information about the social network between the users is also growing.

The above described data mining is challenging in several aspects. The operator would like to obtain the most relevant information and has to choose, among the various available SNA algorithms, the algorithm that best meets the intended goal. Further, the processing of the vast amount of data is highly resource demanding and efficient data handling is required.

SUMMARY

An object of the invention is to alleviate at least one of the above mentioned problems. In particular, it is an object of the invention to provide methods and arrangements for choosing and combining algorithms enabling the identification of various types of users.

The object is according to a first aspect of the invention achieved by a method performed in a computer system for aiding the assessment of an influence of a user in or interacting with a communication system by applying social network analysis, SNA, functions. The method comprises obtaining two or more SNA metrics for each user of a first number of users, each SNA metric being determined by a respective SNA function; calculating a weight parameter for each one of the SNA metrics using a machine learning method, the weight parameters indicating a combination of the SNA metrics for use in the assessment of the influence of the user; and applying the estimated weight parameters to SNA metrics of a second number of users to assess a ranking in accordance with influence of users in the second number of users.

The method provides an efficient solution for handling social network analysis functions in large communication systems. The use of a machine learning method together with the combining of several metrics provides high accuracy and fast execution.

The SNA metrics for each user of the first number of users may be obtained by retrieving available information about the users, e.g. from call data records, and based on this information create a social networks graph for the users. Two or more SNA functions are then applied to this social network graph, for example choosing SNA functions that can readily be parallelized. The output, i.e. the at least two SNA metrics for each user, assigns each user with at least two influence measuring values.

The object is according to a second aspect of the invention achieved by a computer program for a computer system for establishing influence of a user in or interacting with a communication system by applying social network analysis, SNA, functions. The computer program comprises computer program code which when run in the computer system 10 causes the computer system 10 to: obtain two or more SNA metrics for each user of a first number of users, each SNA metric being determined by a respective SNA function; calculate a weight parameter for each one of the SNA metrics using a machine learning method, the weight parameters indicating a combination of the SNA metrics for use in the assessment of the influence of the user; and apply the estimated weight parameters to SNA metrics of a second number of users to assess a ranking in accordance with influence of users in the second number of users.

Advantages corresponding to the above described are thereby obtained.

The object is according to a third aspect of the invention achieved by a computer program product comprising a computer program as above, and computer readable means on which the computer program is stored.

The object is according to a fourth aspect of the invention achieved by a computer system comprising at least a first computer arranged to aid in the assessment of an influence of a user in or interacting with a communication system by applying social network analysis, SNA, functions. The computer system is configured to: obtain two or more SNA metrics for each user of a first number of users, each SNA metric being determined by a respective SNA function; calculate a weight parameter for each one of the SNA metrics using a machine learning method, the weight parameters indicating a combination of the SNA metrics for use in the assessment of the influence of the user; and apply the estimated weight parameters to SNA metrics of a second number of users to assess a ranking in accordance with influence of users in the second number of users.

Further features and advantages of the invention will become clear upon reading the following description and the accompanying drawings. The user mentioned above and in the appended claims covers various types of users. The wording "user . . . interacting with a communication system" covers e.g. a physical person, subscription or telephone number and the interaction could be made via a user equipment. The wording "user in . . . a communication system" means e.g. a user equipment, a gateway or other node of a communication system.

BRIEF DESCRIPTION OF THE DRAWINGS

FIG. 6 illustrates a table over SNA metrics for given SNA functions and user.

DETAILED DESCRIPTION

Figure 1:
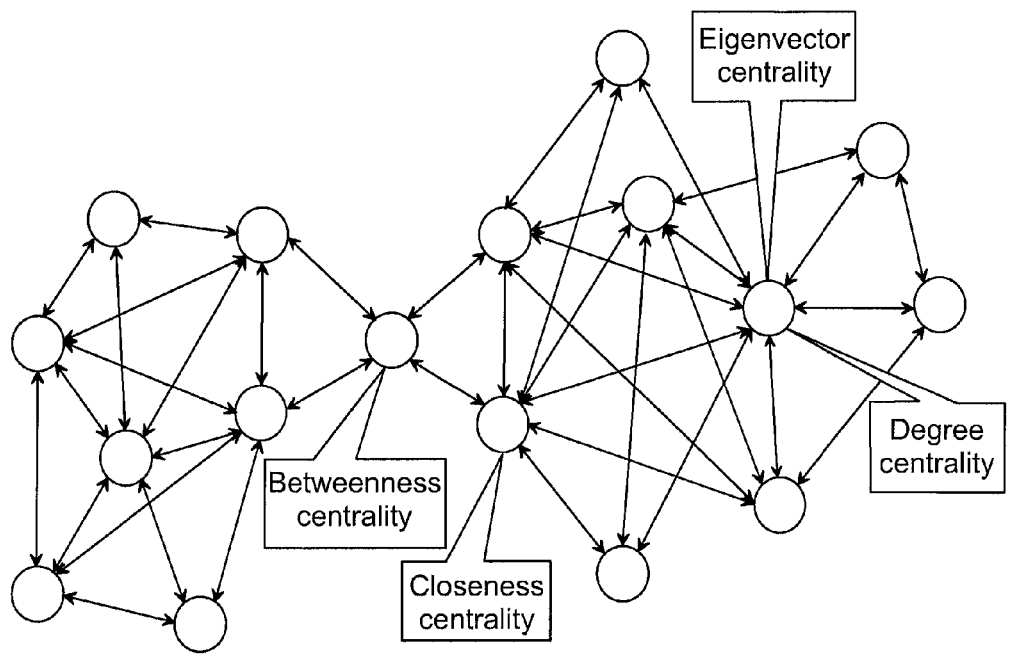
FIG. 1 illustrates a social networks graph.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

FIG. 1 illustrates a social networks graph. With the aid of the graph, various relationships within the social network can be found. In the present description, a communication system, in particular a telecommunication network, is used for illustrating the teachings herein in a more concrete form and the social network is thus exemplified by the social network between telecommunication users. In this regards it is noted that "a user" may be a subscriber of the telecommunication network, i.e. a person, or a node of the telecommunication network, e.g. a gateway in the traffic path between two subscribers or some other node within the telecommunication network, or a user equipment, or a telephone number, etc.

Throughout the description the terms "influence" and "influential user" are used. An "influential user" may be seen as a user that in some regard stands out against other users, or stated differently, an influential user may be seen as a user that in some regard (for some reason) is important to the operator. That is, the operator needs to, or finds it important to identify the user for a particular reason, one reason for example being to identify a user that would be best suited to spread information. The person having the highest "influence" would be the user determined to be best suited to spread information, the person next best suited to spread information would be the one having the next highest influence and so on. Another reason could be to identify non-person nodes. Still another reason could be to identify potential buyers of a certain service. Still another reason could be to identify users (persons) that the operator has a high desire to keep as customers.

More tangible, for each user of a communication system certain parameters can be used to define the user. Returning to the example above, one such parameter may relate to the ability of a user to spread information, "information spreading parameter".

The operator of the communication may, for each user, determine a value of this parameter, and users having a value lying e.g. among the top 10% of all users may be determined to be influential. All the users having parameter values within the top 10% of all users may in turn be ranked in accordance with their influence.

Calculating the parameter values may e.g. involve using a SNA method. A measure on the influence of a user in one specific regards can be obtained by a metric, e.g. a centrality metric or more generally a metric obtained by any SNA method is a measure on influence.

For the telecommunication system example, a social networks graph may be created by retrieving available information about the users, e.g. from call data records (CDRs), and based on this information create the social networks graph for the users. In the social networks graph, the nodes are then a representation of the users and the arrows between the nodes may for example be different calls that have been made. For example, an arrow pointing towards a node may be an incoming call, and an arrow pointing from a node may be an outgoing call.

A difficulty is, as described in the background section, to choose among the vast amount of Social Network Analysis (SNA) algorithms, functions and methods. One type of SNA methods is centrality methods (illustrated in FIG. 1), aimed at finding the most central node(s) in the social network graph. However, the most central node that is output as the result depends on the centrality method that is used. It is therefore difficult to know which centrality method to use, and if several centrality methods are used, then it is difficult to know how to evaluate the results. As a more specific example, if the goal of an operator of the telecommunication system is to pinpoint equipment users that each potentially could reach the largest number of additional users, the operator should choose a centrality method that best meets this goal. Such equipment users could be valuable for the operator as spreaders of information, e.g. about offers. Further, should the operator want to use more than one centrality method for reaching the goal then he must evaluate the results in the best possible way, which is difficult.

Returning now to FIG. 1, the above can be exemplified by the four different centrality methods that are illustrated. Each node in the social network can, in line with the earlier description of a "user", be thought of as representing for example a subscriber/a user equipment, a telephone number, or a gateway. The operator seeking to pinpoint the user that would be best fit to spread information has to choose which of the centrality methods to use to find this user (or users). A first centrality method is betweenness centrality, which can be seen as the node through which the largest number of shortest paths goes. That is, in order to reach a non-adjacent node, the node having the highest betweeneess centrality is passed most times. It can be mentioned that another centrality method, ego betweeness centrality method, is an approximation of betweeness centrality method. A second centrality method is closeness centrality, which provides a measure on how close a node is to all the other nodes in the social networks graph. A node has high closeness centrality measure if it can quickly interact with other nodes, i.e. has short paths to all other nodes. A third centrality method is degree centrality, which gives as the result the node having the highest number of ties to other (neighboring) nodes of the social network. The degree centrality method can, for the telecommunication network example, be specified into out-degree centrality and in-degree centrality, since the connections between the nodes are directional. Out-degree is thus number of ties directed to other nodes and in-degree is the number of ties directed into the node, for example calls made and calls received, respectively. A fourth centrality method is eigenvector centrality. Eigenvector centrality can be seen as a weighted sum of not only direct connections (i.e. between neighboring nodes) but also indirect connections of every length. The eigenvector centrality thus takes into account the entire pattern in the social network.

The above centrality methods may be thought of as being different "flavors" of influence. The different centrality methods give different answers to a question in line with: "who is the most central user?" For example, closeness centrality gives a measure on how far a user is from all other users, while the degree centrality gives a measure on how well connected the user is. Eigenvector centrality gives a measure on the popularity of a user: a user getting a high metric on eigenvector centrality is a user that is connected to the well connected.

In this context it is noted that a metric, e.g. a centrality metric or more generally a metric obtained by any SNA method is a measure on influence. That is, each SNA metric provides a respective measure on the influence of a user. A prerequisite here is that the influence of a user can be measured by the SNA metrics. The type of data that is input to an SNA method in order to obtain the SNA metrics is dependent e.g. on the chosen SNA method, and the social network in question. For the telecommunication network example the input data may be data from the CDR. Other examples on data that can be used as input to the SNA methods comprise Facebook logs, e-mail lists, and demographics.

It is noted again that there is a vast amount of SNA functions, and the teachings herein is not restricted to any specific SNA algorithms, functions or methods, although centrality methods are used for exemplifying aspects of the invention. It is also noted that the different centrality methods, and generally the different SNA functions, differ in complexity and accuracy and consequently have different requirements regarding processing capacity. For example, the ego betweeness centrality method may be seen as an approximation of the betweeness centrality method, and the same type of SNA metrics may be obtained but wherein a tradeoff between accuracy and computation time is made when choosing one or the other centrality method. This is also an aspect to take into account when choosing which centrality method to use.

Figure 2:
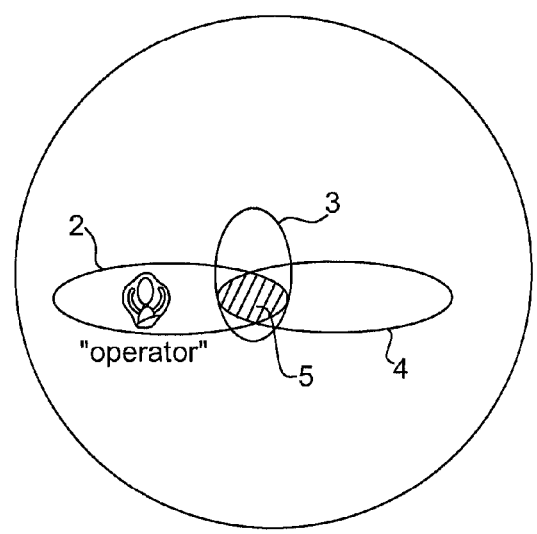
FIG. 2 illustrates schematically the results of centrality methods applied in a telecommunication network.

The difficulties of choosing and combining different SNA functions (exemplified by centrality methods) are further elaborated on with reference to FIG. 2. FIG. 2 illustrates schematically the results of centrality methods that have been applied to all the subscribers in a telecommunication network 1. A first sub-set 2 of subscribers has been determined to have high in-degree/out-degree centrality metrics. A second sub-set 3 of subscribers has been determined to have high betweenness metrics. A third sub-set 4 of subscribers has been determined to have high eigenvector metrics. The sub-sets 2, 3, 4 of subscribers partly overlap, as illustrated by the hatched area 5. That is, some subscribers have high metrics for all the different centrality methods. The operator of the telecommunication network 1 might, for various reasons, want to find these subscribers, for example due to the earlier mentioned desire to pinpoint certain subscribers. In this example, the subscribers of the hatched area 5 may be seen as subscribers having the highest influence within the telecommunication network based on a certain reason.

Briefly, the invention enables, in different aspects, the operator to assess the influence of subscribers by efficiently combining the results from the different SNA functions. The combining is supported by machine learning methods. Different segments of subscribers can be identified by adapting weight parameters. Stated differently, the invention enables, in different aspects, the operator to put together the output of chosen SNA functions through the use of machine learning methods.

Figure 3:
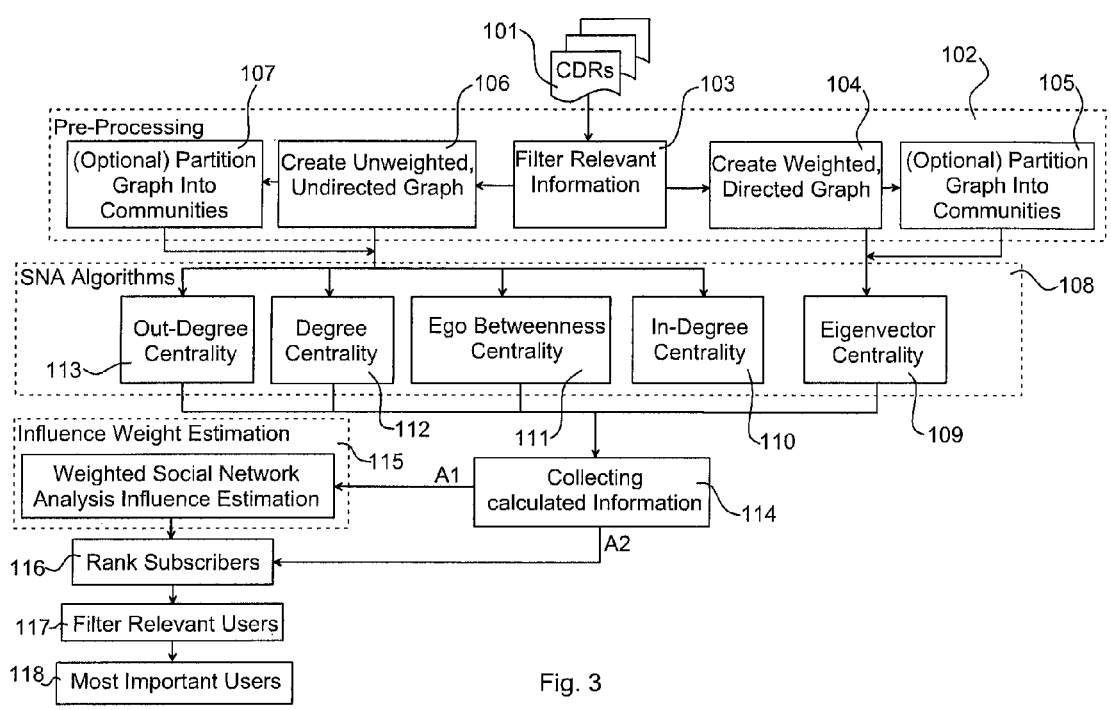
FIG. 3 illustrates an overview of modules for ranking subscribers in accordance with influence.

FIG. 3 illustrates an overview of modules for ranking the subscribers in accordance with influence, outputting a list of the most influential subscribers.

As mentioned earlier, in the telecommunication network example, CDRs 101 (sometimes denoted Event Data Records) can be used as input. Information about traffic within the telecommunication network 1 is stored in such CDR files, which comprise information about events derived from the traffic, e.g. calling party, called party, time of call, type of service, location etc. This information is input to a pre-processing module 102, wherein various pre-processing may be performed. For example, relevant information may first be filtered out (box 103). Then, depending on how the information is to be used, unweighted undirected graphs may be created (box 106) or weighted directed graphs may be created (box 104). More specifically, some SNA functions require weighted directed graphs as input, while other SNA functions require unweighted directed graphs as input. A weighted graph means that different connections between nodes have different strength, the weight or strength of the connection depending e.g. on the number of calls a user has made. For an unweighted connection there is only two values; either connected or not connected. A person skilled in the art realizes that a plurality of different methods of calculating a weighted graph in this pre-processing step could be used in association with the claimed invention and it is therefore not described more in detail. Another possible pre-processing is to partition the graph into communities (box 105, box 107). The pre-processing reshapes the raw CDR data to a form that can be used to calculate different SNA function metrics. The output from the pre-processing module 101 is input to a SNA function module 108, which comprises a number of sub-modules that calculate SNA metrics by using different SNA functions. In box 109 the SNA function eigenvector centrality is used to calculate eigenvector centrality metrics for the nodes of the graph that is input. In box 110 the SNA function in-degree centrality is used for calculate in-degree centrality metrics for the nodes of the graph that is input. In box 111 the SNA function ego betweenness centrality is used for calculating ego betweenness centrality metrics for the nodes of the graph that is input. In box 112 the SNA function degree centrality is used for calculating degree centrality metrics for the nodes of the graph that is input. Finally, in box 113 the SNA function out-degree centrality is used for calculating out-degree centrality of the nodes of the graph that is input. Further, the SNA function module 108 may comprise sub-modules (not illustrated) that do not use SNA functions to calculate a metric. For example, the SNA function module 108 may comprise a sub-module for determining demographics of the nodes (/subscribers) such as gender, age, social status, home area. Another sub-module may determine the billing amount for a certain period of time of a node (/subscriber), or the total billing amount for the total duration of a subscription.

It is noted that other SNA functions than the ones used as examples can be used, and that the number of SNA functions can be chosen by the operator, e.g. in dependence on available processing capacity and/or size of the telecommunication network (and thus amount of data).

The output from the SNA function module 108 is input to an information collection module 114, wherein the information calculated in the SNA function module 108 is gathered. A table containing the calculated metrics for a respective user using the respective SNA functions can for example be set up in the information collection module 114. An example of such table is illustrated in FIG. 6.

To make the estimation of influence of each subscriber as accurate as possible, not only one, but at least two, SNA metrics are used. This may, for a linear example, be expressed as a weighted sum dependent on each of the SNA metrics in accordance with:

$$I = \sum_{C_B} w_{C_B} f(C_B), \quad \text{(eq. 1)}$$

wherein $C_B$ is an arbitrary SNA metric, $w_{C_B}$ is the weight of SNA metric $C_B$ and f(x) is a function used to make the different SNA metrics linearly comparable. To choose these weights properly is challenging and may vary depending e.g. on use case. The solution can be seen as an optimization problem, where the parameters to be altered are the weights. An objective function to this problem could be a ranking list in which some of the nodes belonging to the social network are ranked relative each other. The optimization problem will then be to reconstruct this relative ranking list as good as possible by adjusting the weights.

It is noted that non-linear models may alternatively be used for estimating the influence I. An example of one such non-linear model comprises:

$$I = \sum_{j=0}^{M} w_j^2 \frac{1}{1 + e^{-\sum_{i=0}^{D} w_{ji}^1 x_i}}, \quad \text{(eq. 2)}$$

wherein $w_{ji}$ may be the weight between two nodes in different layers in a neural network (refer to FIG. 5), and x may be a vector of the different SNA metrics.

To calculate the weights, a sub-set of the information that is output from the information collection module 114 is input (arrow A1) to an influence weight estimation module 115. This sub-set is also denoted training set. It is noted that in other embodiments, the training set is not a sub-set of the information output from information collection module 114, but an entirely different set of data. For example, in one embodiment, earlier calculated SNA metrics based on CDRs is used. In another embodiment, the unwanted nodes, mentioned in relation to the description of FIG. 4, may be used as a training set. The influence weight estimation module 115 calculates weights for the SNA functions and output these to a ranking module 116.

The ranking module 116 thus receives the weights for the SNA functions. The ranking module 116 takes as input also (arrow A2) parts of or the entire information collection (e.g. table as described) gathered in the information collection module 114. The weights are applied for this collection of information and output to a filtering module 117. That is, the nodes of the complete graph are ranked in accordance with influence.

In the filtering module 117, which takes as input the list of ranked nodes, the top nodes (/subscribers) may be filtered out and output to a result module 118, which output the most influential users for easy access to the operator.

It is noted that not all modules and/or sub-modules of FIG. 3 need to be used in an implementation. For example, the filtering module 117, sub-modules of the pre-processing module 102 and/or sub-modules of the SNA function module 108 may be omitted depending on the application at hand.

Figure 4:
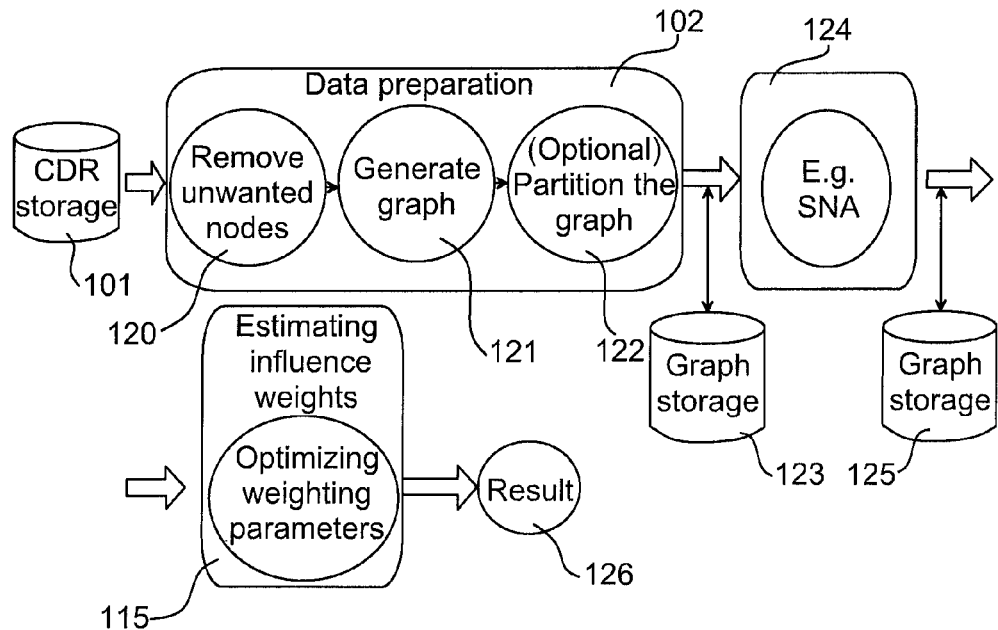
FIG. 4 illustrates an implementation example.

FIG. 4 illustrates an implementation example, wherein same reference numerals as in FIG. 3 are used where applicable. The pre-processing module 102 receives as input traffic information from the CDR storage 101. In particular, the filtering module 103 receives this traffic information. In this implementation the filtering module 103 of FIG. 4 is exemplified by a filtering module 120 configured to remove unwanted nodes. The unwanted nodes may for example be non-person nodes, such as automated phone services, support number and telemarketing companies. Some of these unwanted nodes may be identified by studying in- and out-degree. Nodes with none or very low in- or out-degree can be removed. One way of implementing this is to set a threshold when determining which users actually have a relation to each other. For example, if two users have called each other at least three times in both directions this could be a criterion for an existing relation, and then most non-person nodes will be effectively eliminated. Another way of implementing removal of non-person nodes is by analyzing the relation between in-/out-degree. A voice mail device is a non-person node and could thereby be removed, since it usually has more incoming than outgoing calls. To use such filtering is advantageous since if unwanted nodes are taken into consideration the result might be distorted. In other embodiments the traffic information may be filtered in other or additional ways. In yet other embodiments, the traffic information is not filtered at all.

When the traffic information has been filtered, the remaining traffic information is input to a graph generation module 121 (compare with boxes 104, 106 of FIG. 3). The graph generation module 121 generates one or more social network graphs based on the information contained within the CDRs as filtered by the filtering module 120. CDR files covering a longer period of time will yield more accurate graphs. The social network graphs may be portioned into communities by graph module 122 (compare with boxes 105, 107 of FIG. 3). It is noted that a social networks graph is not necessarily a literal graph, but could e.g. be a table.

The output from the pre-processing module 102 is thus one or more social networks graphs, which may be stored in a first graph storage 123 for later retrieval. The social networks graphs are input to a function module 124, which may be the SNA function module 108 of FIG. 3, or a module calculating metrics for the nodes by means of other types of functions. The result is input to the influence weight estimation module 115, and may be stored in a second graph storage 125. In this context it can be noted that the training set mentioned earlier may be retrieved from the second graph storage 125. The influence weight estimation module 115 is configured to estimate the influence weights for each of the input metrics by using a machine learning method. The result, weights for each of the metrics, is output to a ranking module 126 (compare with 116 of FIG. 3). When the weights are set to suitable values, the ranking module 126, receiving a complete graph, can now perform a ranking of the complete graph. That is, the weights are typically used on larger sets of metrics, for example for ranking all users in the telecommunication system.

In the following, examples on how to estimate the weights of the different metrics will be given. The weights are calculated by using machine learning, in particular supervised machine learning. Many methods exists within the field of supervised machine learning, two examples of which are decision trees and neural networks, which both methods can be trained by supervised machine learning.

Figure 5:
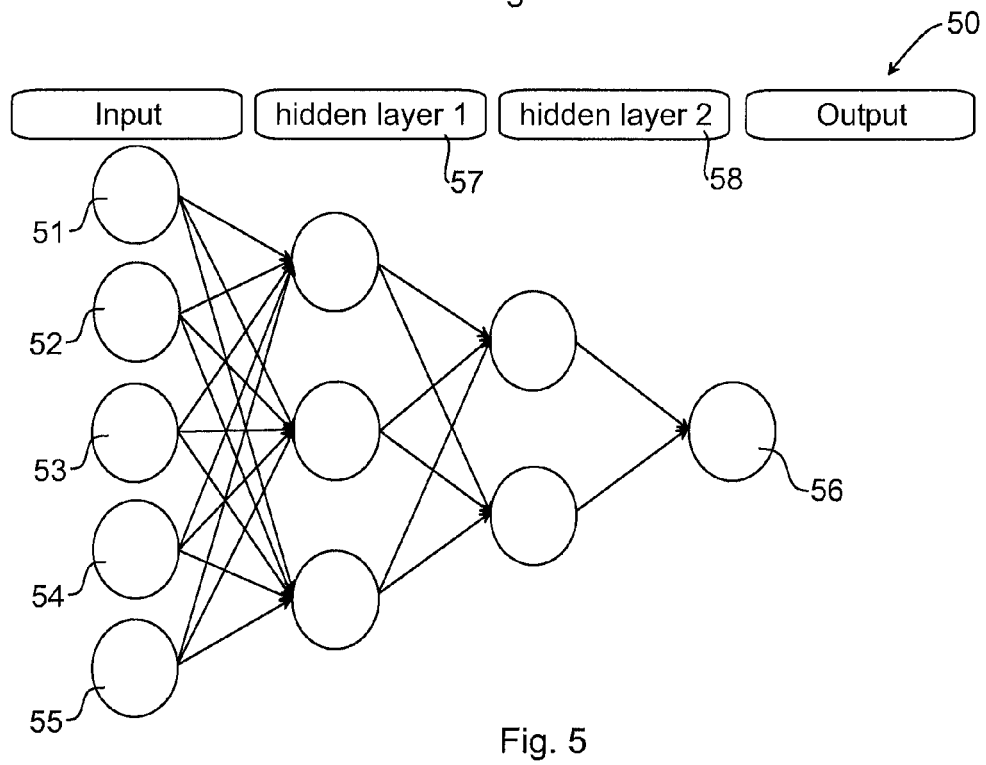
FIG. 5 illustrates a neural network, exemplifying a first machine learning method.

FIG. 5 illustrates a neural network, exemplifying a first machine learning method. Given premises of the neural network are the input and the output. The number of inputs and outputs are arbitrary and can be chosen in dependence e.g. on required accuracy. In the neural network 50 of FIG. 5, five input sources 51, 52, 53, 54, 55 are used, which will be reduced to a single output 56 giving an influence measure. The input sources 51, 52, 53, 54, 55 are exemplified by Degree centrality, in-degree centrality, out-degree centrality, ego betweenness centrality and eigenvector centrality respectively. Between the inputs 51, 52, 53, 54, 55 and the output: 56 there are a number of layers, in the illustrated case two: first hidden layer 57 and a second hidden layer 58. Each additional layer adds to the complexity of the optimization problem consisting of matching the weights in best possible way. Each additional layer also improves the result. The use of two layers is in most cases sufficient. Between two consecutive layers, there are arrows between the nodes in the different layers, indicating weights. These weights are thus to be optimized, e.g. by using steepest descent method, to make the output match an objective function as good as possible.

Referring again to the previously mentioned non-linear example:

$$I = \sum_{j=0}^{M} w_j^2 \frac{1}{1 + e^{-\sum_{i=0}^{D} w_{ji}^1 x_i}} \quad \text{(eq. 2)}$$

For the neural network, $w_{ji}$ is the weight between two nodes in different layers in the neural network, e.g. $w_{51}$ is the weight between input source 51 and the uppermost node of the hidden layer 1 in FIG. 5, and x may be a vector of the different SNA metrics e.g. x(1) degree centrality, x(2) betweeness centrality etc. x are input to the Neural networks e.g. at inputs 51-55 in FIG. 5.

FIG. 6 illustrates a table 200 over SNA metrics for given SNA functions for each user. The first (leftmost) column identifies a particular user. The second, third, fourth, fifth and sixth columns represent a respective SNA function, and in particular the SNA metrics for the respective SNA function for each user. The last (rightmost) column of the table 200 defines a classification of each user. For example, in the second column the SNA metrics resulting when using the SNA function "Degree centrality" is given for each identified user. Similarly, in the third column the SNA metrics resulting when using the SNA function "in-degree centrality" is given for each user. The fourth, fifth and sixth columns are likewise SNA metrics for the (exemplifying) SNA functions out-degree centrality, ego betweenness centrality and eigenvector centrality.

As a particular example, and with reference to FIGS. 5 and 6, the first row of table 200 of FIG. 6, i.e. the SNA metrics having values 6, 5, 3, 15, 0.46 for a first user is input to inputs 51, 52, 53, 54, and 55 respectively. The SNA metrics are combined using a respective weight parameter for each SNA metrics. The outputs from the first layer are input to the second layer, wherein a new combination is made. The output from the second layer is compared to the known influence measure for the first user: "no" (which could be implemented as a numerical value of 1 corresponds to "yes" and a numerical value of 0 corresponds to "no"). The process is repeated for the second user, third user, fourth user, ... e.g. for as many users as there are. For each iteration, the accuracy of the weight parameters increases. The iterative process could be ended when the comparison of the output of the second layer to the known value is smaller than a set threshold difference.

One part of the optimization process is to choose a proper objective function. A first example of such objective function is to use information that is available. In a particular example, information (e.g. CDRs) that is available to the operator of the telecommunication system. Further examples on information comprise spending history e.g. if the subscriber has bought a new phone or spent certain amount of money on games, demographic data e.g. age, sex, income, married/not married, address etc. The operator may already have knowledge about some of the most influential users. A training set can then be put together comprising these users known to have high influence and additional users, e.g. part of the further users in the communication system. The weights are then used in an optimization process, e.g. repeatedly updated and improved, in an effort to optimize them, so that the users known to have high influence are ranked as high as possible. The knowledge of users having high influence may have been determined beforehand, e.g. by analyzing data manually whereby e.g. the operator of the telecommunication network pinpoints users he finds influential.

A second example of such objective function is to use a more complex and time-consuming SNA metrics as the training set. The weights are then optimized so as to reconstruct these SNA metrics to best possible extent. For example, to calculate the exact betweenness centrality of each user in the network is difficult for most real networks within a reasonable time. However, doing the SNA metrics calculations for a small part of the network is more plausible. This small part is then used as the training set for tuning (optimizing) the weight parameters.

Figure 7:
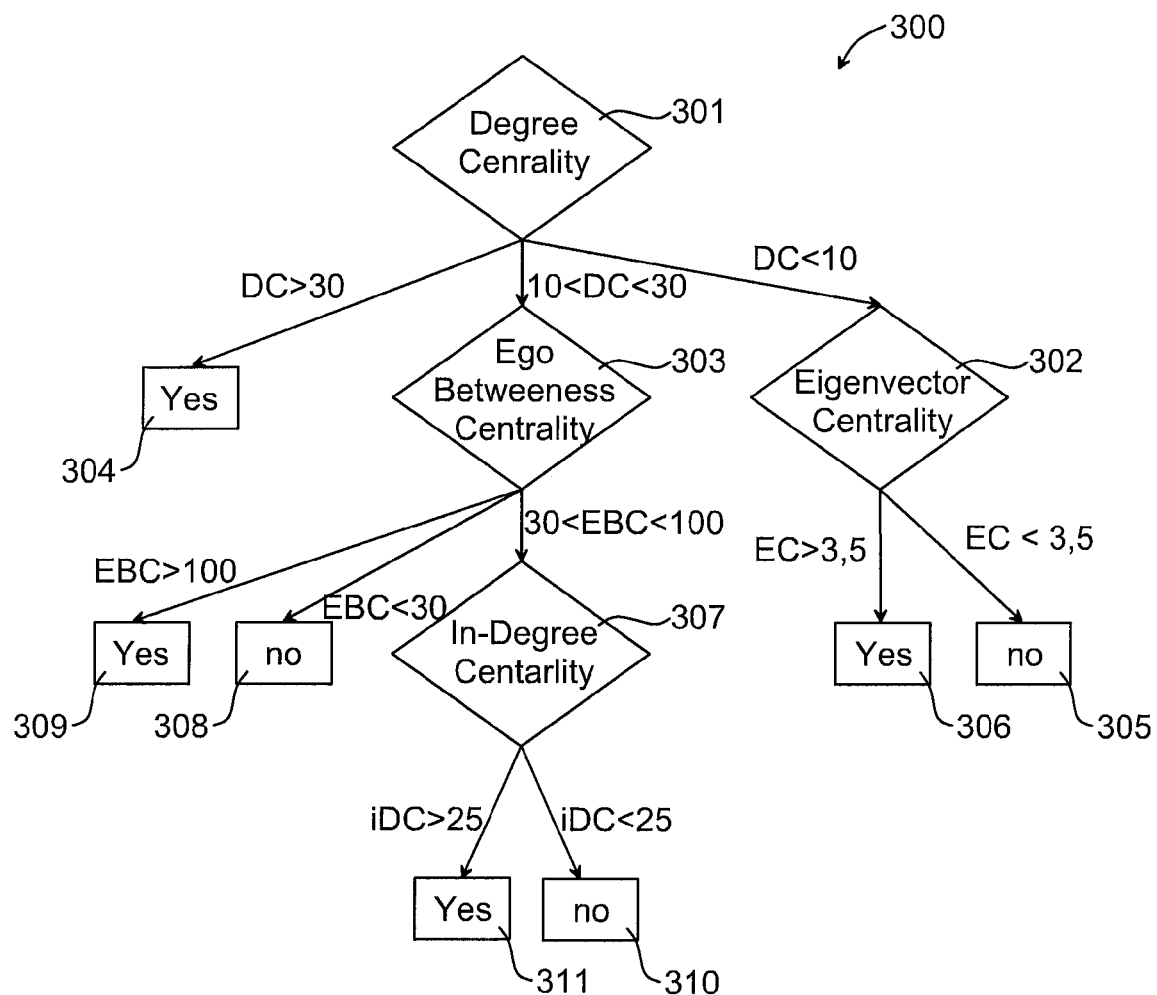
FIG. 7 illustrates a decision tree, exemplifying a second machine learning method.

FIG. 7 illustrates a decision tree, exemplifying a second machine learning method. A decision tree provides a way of gaining insight to the nature of the data at hand. The decision tree can be used for classification, for example for classifying users into groups of influential and non-influential. The decision tree may further be used for finding out if the metrics are related to each other.

The decision tree 300 comprises a set of nodes 301, 302, 303, 304, 305, 306, 307, 308, 309, 310, 311, each node representing a rule that is used to classify the entities of the problem into either influential or non-influential user. Each entity is composed of a number of attributes which characterize the entity. As a particular example, the entities are the users of a telecommunication network and the attributes are different SNA metrics, see FIG. 6 for an example of a training set. That is, the decision tree 300 could have resulted from the exemplary training set of FIG. 6.

Branches of the decision tree 300 connect the nodes and lead the classifying algorithm on a specific path depending on the SNA metrics for the individual user. For example, with reference to the first row of the table 200 of FIG. 6, a user identified by subscriber id 1, has the SNA metric values 6, 4, 3, 15, and 0.46 for the respective SNA functions. Traversing the decision tree 300, with the exemplifying rules, classifies the user identified by subscriber id 1 to be not influential. In particular, starting at the root node 301, the SNA metric for degree centrality (=6) is compared according to the set rules (e.g. degree centrality>30, 10<degree centrality<30 and degree centrality<10), resulting in the path leading to node 302. In node 302, the SNA metric for eigenvector centrality is compared according to the rules, resulting in the classification as non-influential.

Ideally, each user in the training set (e.g. training set 200, refer to FIG. 6) can be classified correctly using the decision tree (e.g. decision tree 300 of FIG. 7). However, this is not always possible for an arbitrary set of instances (e.g. users). In order to avoid over-fitting, which implies that the decision tree that has been determined is too strictly used by the training set, a validation set may be used to test the rules.

In order to construct the decision tree, an algorithm called C4.5 may be used. C4.5 is a recursive algorithm that for each step considers each of the attributes (SNA metrics) separately. For each SNA metric, an information gain is calculated and the attribute giving the highest information gain is used to construct a rule. A number of branches will specify possible paths from the node. For each of these branches the algorithm will repeat the information gain optimization for the remaining SNA metrics. This is continued until no improvement can be made to the classifying abilities of the decision tree. The expected information gain is the change in information entropy from a prior state to a state that takes some information as given, i.e. an increased information gain means that a larger number of users are correctly classified.

Figure 8:
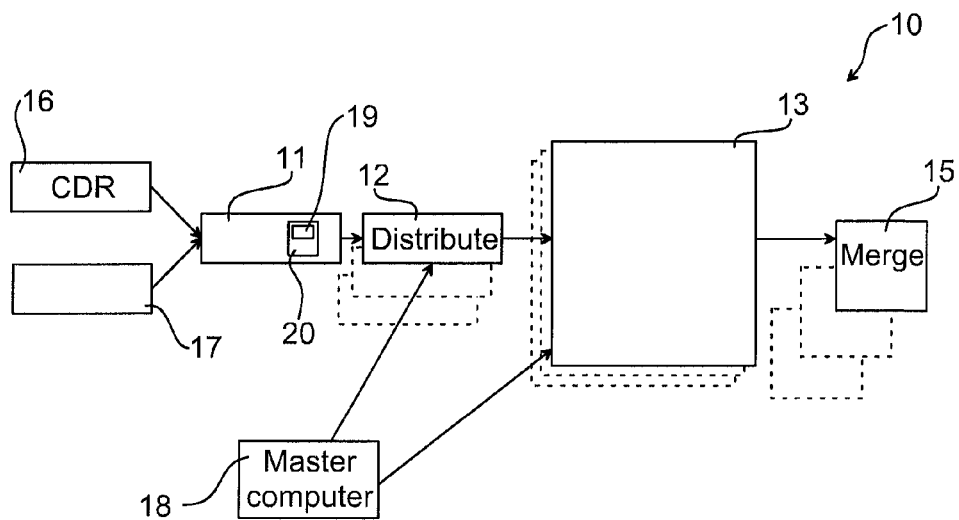
FIG. 8 illustrates an exemplifying computer system for implementing aspects of the invention.

FIG. 8 illustrates an exemplifying computer system for implementing aspects of the invention. The methods as described may be implemented by means of a distributed computer system 10 (distributed data processing system). Hadoop software framework is utilized in an embodiment.

Data, e.g. CDR 16 and/or other types of data such as e-mail traffic, facebook data etc., here indicated at reference numeral 17, are provided to a first computer/server 11, which may be owned by a telecommunication network operator. The data is provided from the first computer/server 11 to a second computer/server 12. The second computer 12 belongs to the computer system 10 and distributes the data among a group of third computers/servers 13 which also belong to the computer system 10. The second computer 12 is here illustrated as a single computer, but it is noted that the second computer 12 could in fact be a set of computers (schematically illustrated by hatched lines), that distribute the data among the group of third computers 13. The distribution is thus scalable and more easily adapted to large amount of data in that the third computers 13 can work in parallel. One way for implementing the distribution is to utilize Hadoop map/reduce with a master computer 18 as jobtracker. The master computer 18 may then belong to the computer system as well and in such an embodiment, the master computer 18 uses both the second computer 12 and the third computers 13 as slaves/tasktrackers. The number of parallel third computers 13 may be any number ranging from two computers to several thousands and using Hadoop map/reduce.

The methods may be implemented using a single computer 11, and the computer system 10 then comprises the first computer 11, which is arranged to aid in the assessment of an influence of a user in or interacting with a communication system by applying social network analysis, SNA, functions. As described earlier, the first computer 11 receives data to be processed from e.g. CDR 16 databases. The computer system 10, i.e. the first computer 11, is configured to implement the methods as described, in particular: to obtain two or more SNA metrics for each user of a first number of users, each SNA metric being determined by a respective SNA function; to calculate a weight parameter for each one of the SNA metrics using a machine learning method, the weight parameters indicating a combination of the SNA metrics for use in the assessment of the influence of the user; and to apply the estimated weight parameters to a second number of users to assess a ranking in accordance with influence of users in the second number of users.

However, typically very large amount of data is to be processed and the computer system 10 then comprises the second computer 12, which is arranged to receive data from the first computer 11. The computer system 10 also then comprises the group of third computers 13 connected to the second computer 12, wherein the second computer 12 is arranged to delegate a task for execution by the group of third computers 13. The task may comprise calculating the SNA metrics for the users based on a SNA function, wherein each computer of the group of third computers 13 may be configured to calculate the SNA metrics based on a respective SNA function. The task may also comprise calculating a dedicated part of the machine learning method. In this embodiment, the computer system 10 also comprises a merging unit 15, which could be a computer/server, and is connected to the group of third computers 13. The merging unit 15 may be configured to merge data received from the group of third computers 13 into a classifying function providing the influence of the user.

The accuracy of the weight parameters and ultimately the accuracy of the influence ranking may typically be increased by making use of more information. However, increased computational time may result. Sources providing the inaccuracy may comprise using approximate SNA metrics, or inability of SNA functions to capture the reality of the social network representing the telecommunication network. Taking into account a larger number of metrics as well as more complex metrics may increase the accuracy. The accuracy may thus be set based on computational resources and/or computer set up. In embodiments of the computer system 10, wherein parallelized computers are used, a higher accuracy may typically be obtained.

Figure 9:
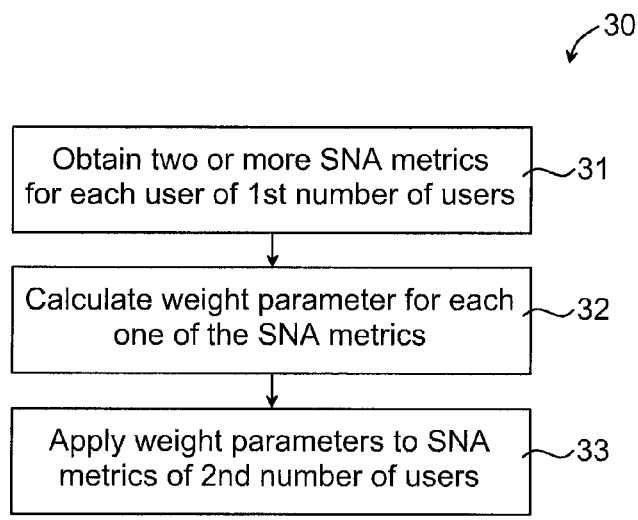
FIG. 9 is a flow chart over steps of a method in an aspect of the invention.

FIG. 9 is a flow chart over steps of a method in an aspect of the invention. The method 30 is performed in a computer system 10 for aiding in the assessment of an influence of a user in or interacting with a communication system by applying social network analysis, SNA, functions. The method 30 comprises obtaining 31 two or more SNA metrics for each user of a first number of users. Each SNA metric is determined by a respective SNA function. The first number of users is thus the training set as described earlier.

The method 30 further comprises calculating 32 a weight parameter for each one of the obtained SNA metrics. A machine learning method is used for estimating the weight parameters and the weight parameters indicate a combination of the SNA metrics for use in the assessment of the influence of the user.

The method 30 further comprises applying 33 the estimated weight parameters to SNA metrics of a second number of users to assess a ranking in accordance with influence of users in the second number of users. All the users in the second number of users may be ranked in accordance with influence, or only a part of the second number of users. The second number of users is typically equal to or larger than the first number of users. As a particular example, the first number of users is the training set and the second number of users is all the users in the communication system. As another particular example, the first number of users is a sub-set of the second number of users.

In an embodiment, the using of a machine learning method comprises: inputting to the machine learning method a training set comprising the two or more SNA metrics for each one of the first number of users and a respective known (determined beforehand) influence of the user, and outputting, from the machine learning method, a classifying function for assessment of the influence of the users.

The classifying function is then used for a group of users, the influence of which is to be determined.

In an embodiment, the machine learning method comprises or involves a decision tree comprising one or more nodes, and the using of a machine learning method comprises constructing the decision tree by means of a C4.5 algorithm. The method then comprises traversing the decision tree for the SNA metrics of each user of the second number of users, when determining the user to be influential or not influential.

In embodiments using a decision tree as the machine learning method, the weight parameter of an SNA metric may be related to the location of a node within the decision tree, a root node of the decision tree having the highest weight parameter and each leaf node of a branch having a weight parameter decreasing with distance to the root node.

In embodiments using a decision tree as the machine learning method, the method 30 may further comprise: inputting, to the computer system 10, a training set comprising a sub-set of user related data; choosing, at each node, the SNA metric giving the highest normalized information gain for splitting the sub-set of user related data into two or more further sub-sets; and repeating the choosing of SNA metric until a predetermined criterion is met.

The choosing of SNA metric may thus be repeated until a predetermined criterion is met. For example, the criterion could be that no improvement any longer can be made to the influence establishing abilities of the decision tree (refer also to FIG. 7 and the related description regarding decision trees).

In another embodiment, the machine learning method comprises or involves a neural network.

In embodiments using the neural network as the machine learning method, the method 30 may comprise: inputting SNA metrics for at least two SNA functions relating to one user to a first layer, in which first layer the SNA metrics are combined with a respective weight parameter; comparing the output of the first layer with a known value; and repeating the inputting of SNA metrics, and comparing for SNA metrics relating to further users, wherein the weight parameters of a previous iteration is used in a following iteration, until the comparison results in a difference smaller than a set threshold difference. Refer also to FIG. 6 and related description regarding neural networks.

In other embodiments using the neural network as the machine learning method, the neural network may comprise several layers. In particular, the method 30 may comprise: inputting SNA metrics for at least two SNA functions relating to one user to a first layer, in which first layer the SNA metrics are combined with a respective weight parameter; inputting the output of the first layer to a second layer, in which second layer the output of the first layer are combined with a respective weight parameter; comparing the output of the second layer with a known value; and repeating the inputting of SNA metrics, and comparing for SNA metrics relating to further users, wherein the weight parameters of a previous iteration is used in a following iteration, until the comparison results in a difference smaller than a set threshold difference.

In an embodiment, the estimating of weight parameters comprises adapting the weight parameters so as to match available knowledge of the influence of each user of a sub-set of users. This is a convenient way of providing the weight parameters with highest possible accuracy and no or little effort is required in obtaining information for a training set as available knowledge is used.

The available knowledge may for example comprise a list of the sub-set of users, the list including users determined beforehand to have high influence and the first number of users, and the adapting of the weight parameters comprises adapting the weight parameters so as to rank the users determined beforehand to have high influence highest.

In another embodiment, the available knowledge comprises the results of calculation of SNA metrics by an advanced SNA function for each user of the sub-set of users, each SNA metric providing a measure on the influence of the user.

In various embodiments, the SNA functions may comprise eigenvector centrality and/or degree centrality and/or betweenness centrality and/or closeness centrality and the SNA metrics comprise eigenvector centrality metric and/or degree centrality metric and/or betweenness centrality metric and/or closeness centrality metric. Any combination of SNA function may be used, and chosen e.g. in dependence on available processing capacity, accuracy requirements, time available etc.

In one embodiment, the influence, I, of a user is expressed as:

$$I = \sum_{C_B} w_{C_B} f(C_B),$$

wherein $C_B$ is an SNA metric, $w_{C_B}$ is the weight parameter of SNA metric $C_B$ and f(x) comprises a function rendering the at least two SNA metrics linearly comparable.

The modules described in relation to FIGS. 3 and 4, for example the SNA function modules 108, 109, 110, 111, 112 and 113, and the influence weight estimation module 115, may be implemented as computer program modules of a computer program 19 comprising code means which when run by the computer system 10 causes the computer system 10 to perform the above-described functions and methods. The computer program 19, or the computer program modules, may be run on one or more of the computers of the computer system 10. The computer program 19 is schematically illustrated in FIG. 8, exemplified as being run in the first computer 11.

In particular, the invention encompasses the computer program 19 for a computer system 10 for establishing influence of a user in or interacting with a communication system by applying social network analysis, SNA, functions. The computer program 19 comprises computer program code which when run in the computer system 10 causes the computer system 10 to: determine two or more SNA metrics for each user of a first number of users, each SNA metric being determined by a respective SNA function; use a machine learning method for estimating a weight parameter for each of the two or more determined SNA metrics, the weight parameters indicating a combination of the SNA metrics for use in establishing the influence of the users; and apply the estimated weight parameters to SNA metrics of a second number of users to assess a ranking in accordance with influence of users in the second number of users.

The invention also encompasses a computer program product 20 comprising the computer program 19 as described above, and computer readable means on which the computer program 19 is stored.

The computer program 19 may be carried by the computer program product 20. The computer program product 20 comprises a computer readable medium on which the computer program 19 is stored. For example, the computer program product 20 may be a flash memory, a RAM (Random-access memory), ROM (Read-Only memory) or an EEPROM (Electrically Erasable Programmable ROM), and the computer program modules described above could in alternative embodiments be distributed on different computer program products in the form of memories within the computer system 10. The computer program product 20 may be an optical disc, such as a CD (compact disc) or a DVD (digital versatile disc) or a Blu-Ray disc.

The invention claimed is:

1. A method performed in a computer system for aiding assessment of an influence of a user in or interacting with a communication system by applying social network analysis (SNA) functions, the method comprising:

obtaining two or more SNA metrics for each user of a first number of users, each SNA metric being determined by a respective SNA function, calculating a weight parameter for each one of the SNA metrics using a machine learning method, the weight parameters indicating a combination of the SNA metrics for use in the assessment of the influence of the user, and applying the weight parameters calculated from the SNA metrics of the first number of users to SNA metrics of a second number of users to assess a ranking in accordance with influence of users in the second number of users.

2. The method as claimed in claim 1, wherein the using of a machine learning method comprises:

inputting to the machine learning method a training set comprising the two or more SNA metrics for each one of the first number of users and a respective known influence of the user, and outputting, from the machine learning method, a classifying function for assessment of the influence of the users.

3. The method as claimed in claim 1, wherein the machine learning method use a decision tree comprising one or more nodes, and the using of the machine learning method comprises constructing the decision tree by a C4.5 algorithm.

4. The method as claimed in claim 3, comprising traversing the decision tree for the SNA metrics of each user of the second number of users, when determining the user to be influential or not influential.

5. The method as claimed in claim 3, wherein the weight parameter of a SNA metric is related to the location of a node within the decision tree, a root node of the decision tree having the highest weight parameter and each leaf node of a branch having a weight parameter decreasing with distance to the root node.

6. The method as claimed in claim 3, comprising:

inputting, to the computer system, a training set comprising a sub-set of user related data, choosing, at each node, the SNA metric giving the highest normalized information gain for splitting the sub-set of user related data into two or more further sub-sets, and repeating the choosing of SNA metric until a predetermined criterion is met.

7. The method as claimed in claim 1, wherein the machine learning method uses a neural network.

8. The method as claimed in claim 7, comprising:

inputting SNA metrics for at least two SNA functions relating to one user to a first layer, in which first layer the SNA metrics are combined with a respective weight parameter, comparing the output of the first layer with a known value, and repeating the inputting of SNA metrics, and comparing for SNA metrics relating to further users, wherein the weight parameters of a previous iteration is used in a following iteration, until the comparison results in a difference smaller than a set threshold difference.

9. The method as claimed in claim 7, comprising:

inputting SNA metrics for at least two SNA functions relating to one user to a first layer, in which first layer the SNA metrics are combined with a respective weight parameter, inputting the output of the first layer to a second layer, in which second layer the output of the first layer are combined with a respective weight parameter, comparing the output of the second layer with a known value, and repeating the inputting of SNA metrics, and comparing for SNA metrics relating to further users, wherein the weight parameters of a previous iteration is used in a following iteration, until the comparison results in a difference smaller than a set threshold difference.

10. The method as claimed in claim 1, wherein the estimating of weight parameters comprises adapting the weight parameters so as to match available knowledge of the influence of each user of a sub-set of users.

11. The method as claimed in claim 10, wherein the available knowledge comprises a list of the sub-set of users, the list including users determined beforehand to have high influence and the first number of users, and the adapting of the weight parameters comprises adapting the weight parameters so as to rank the users determined beforehand to have high influence highest.

12. The method as claimed in claim 10, wherein the available knowledge comprises the results of calculation of SNA metrics by an advanced SNA function for each user of the sub-set of users, each SNA metric providing a measure on the influence of the user.

13. The method as claimed in claim 1, wherein the SNA functions comprise at least one of: eigenvector centrality, degree centrality, betweenness centrality, and closeness centrality and the SNA metrics comprise at least one of: eigenvector centrality metric, degree centrality metric, betweenness centrality metric, and closeness centrality metric.

14. The method as claimed in claim 1, wherein the influence, I, of a user is expressed as:

$$I = \sum_{C_B} w_{C_B} f(C_B),$$

wherein $C_B$ is an SNA metric, $w_{C_B}$ is the weight parameter of SNA metric i and f(x) comprises a function rendering the at least two SNA metrics linearly comparable.

15. A computer program product comprising a computer program for a computer system for establishing influence of a user in or interacting with a communication system by applying social network analysis (SNA) functions, and a non-transitory computer readable medium on which the computer program is stored, wherein the computer program comprises computer program code which when run in the computer system causes the computer system to:

obtain two or more SNA metrics for each user of a first number of users, each SNA metric being determined by a respective SNA function, calculate a weight parameter for each one of the SNA metrics using a machine learning method, the weight parameters indicating a combination of the SNA metrics for use in the assessment of the influence of the user, and apply the estimated weight parameters calculated from the SNA metrics of the first number of users to SNA metrics of a second number of users to assess a ranking in accordance with influence of users in the second number of users.

16. The computer program product as claimed in claim 15, wherein the SNA functions comprise at least one of: eigenvector centrality, degree centrality, betweenness centrality, and closeness centrality and the SNA metrics comprise at least one of: eigenvector centrality metric, degree centrality metric, betweenness centrality metric, and closeness centrality metric.

17. A computer system comprising at least a first computer arranged to aid in assessment of an influence of a user in or interacting with a communication system by applying social network analysis (SNA) functions, the computer system being configured to:
  obtain two or more SNA metrics for each user of a first number of users, each SNA metric being determined by a respective SNA function,
  calculate a weight parameter for each one of the SNA metrics using a machine learning method, the weight parameters indicating a combination of the SNA metrics for use in the assessment of the influence of the user, and
  apply the estimated weight parameters calculated from the SNA metrics of the first number of users to SNA metrics of a second number of users to assess a ranking in accordance with influence of users in the second number of users.

18. The computer system as claimed in claim 17, wherein the computer system comprises a second computer arranged to receive data from the first computer, and a group of third computers connected to the second computer, wherein the second computer is arranged to delegate a task for execution by the group of third computers.

19. The computer system as claimed in claim 18, wherein the task comprises calculating the SNA metrics for the users based on a SNA function, wherein each computer of the group of third computers is configured to calculate the SNA metrics based on a respective SNA function.

20. The computer system as claimed in claim 18, wherein the task comprises calculating a dedicated part of the machine learning method.

21. The computer system as claimed in claim 18, comprising a merging unit connected to the group of third computers and configured to merge data received from the group of third computers into a classifying function providing the influence of the user.

22. The computer system as claimed in claim 17, wherein the SNA functions comprise at least one of: eigenvector centrality, degree centrality, betweenness centrality, and closeness centrality and the SNA metrics comprise at least one of: eigenvector centrality metric, degree centrality metric, betweenness centrality metric, and closeness centrality metric.

* * * * *